United States Patent [19]

Gof

[11] 4,258,485
[45] Mar. 31, 1981

[54] PEDAL PLOW

[76] Inventor: M. Shamel Gof, 89 Haledon Ave., Paterson, N.J. 07522

[21] Appl. No.: 66,594

[22] Filed: Aug. 14, 1979

[51] Int. Cl.³ .............................................. E01H 5/00
[52] U.S. Cl. ...................................... 37/41; 280/253
[58] Field of Search .................... 37/41, 42 R, 50, 53, 37/130; 280/87.01, 152 R, 160, 47.24, 289 R, 727, 200, 210, 259–261, 253–254, 255, 258

[56] References Cited

U.S. PATENT DOCUMENTS

| | | | |
|---|---|---|---|
| 42,678 | 5/1864 | Moores | 280/258 |
| 2,345,460 | 3/1944 | Coderre | 37/53 X |
| 2,776,767 | 1/1957 | Stover | 280/289 R X |
| 2,816,772 | 12/1957 | Lapointe | 37/41 X |
| 2,908,090 | 10/1959 | Eifel | 37/53 |
| 2,986,406 | 5/1961 | Kahl | 280/253 |
| 3,035,854 | 5/1962 | Johnston | 280/255 X |
| 3,430,982 | 3/1969 | Despain et al. | 280/255 |
| 3,509,955 | 5/1970 | Lichfield | 37/53 X |
| 3,664,042 | 5/1972 | Duran | 37/53 X |
| 4,048,735 | 9/1977 | Brunty | 37/50 X |

FOREIGN PATENT DOCUMENTS

| | | | |
|---|---|---|---|
| 636792 | 9/1936 | Fed. Rep. of Germany | 280/253 |
| 825811 | 12/1951 | Fed. Rep. of Germany | 280/253 |
| 9385 | of 1894 | United Kingdom | 280/253 |

Primary Examiner—E. H. Eickholt

[57] ABSTRACT

A pedal driven plow having a frame, front and rear wheeled axles and a plow blade pivotally mounted to the front of the frame. A pair of longitudinally extended, pivotally mounted pedals have tongues on their underside which alternately engage gears on the rear axle to propel the plow when the pedals are alternately raised and depressed by a walking motion. Support bars are provided along the frame sides. An alternate embodiment utilizes a chain drive.

3 Claims, 13 Drawing Figures

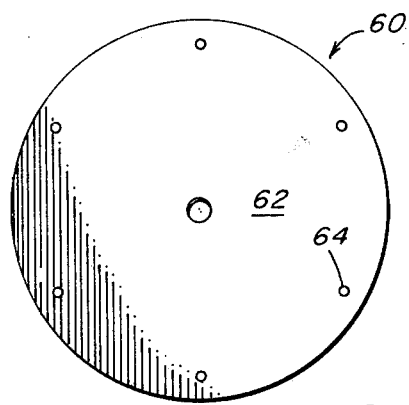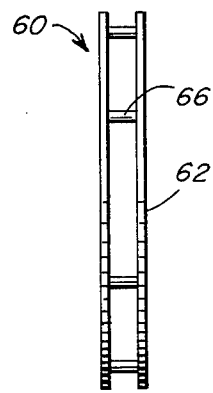
FIG. 5            FIG. 4
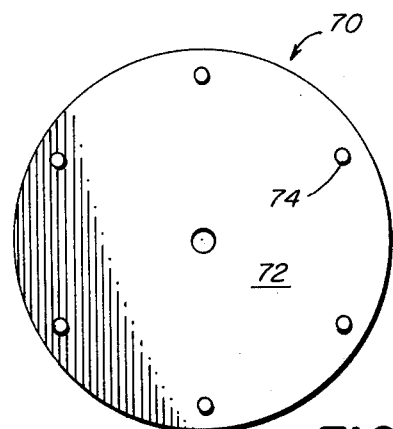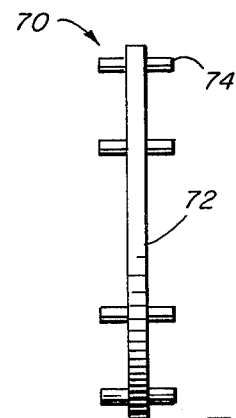
FIG. 7            FIG. 6
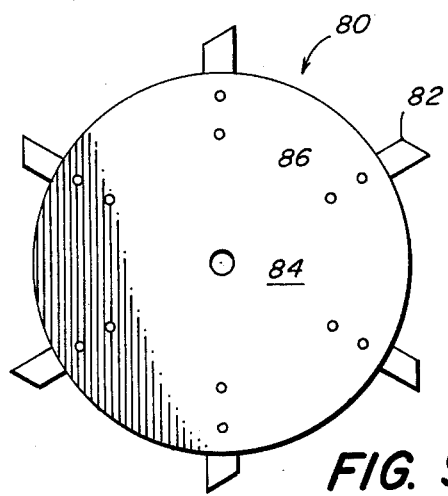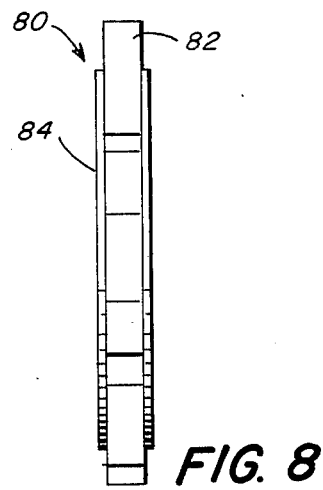
FIG. 9            FIG. 8

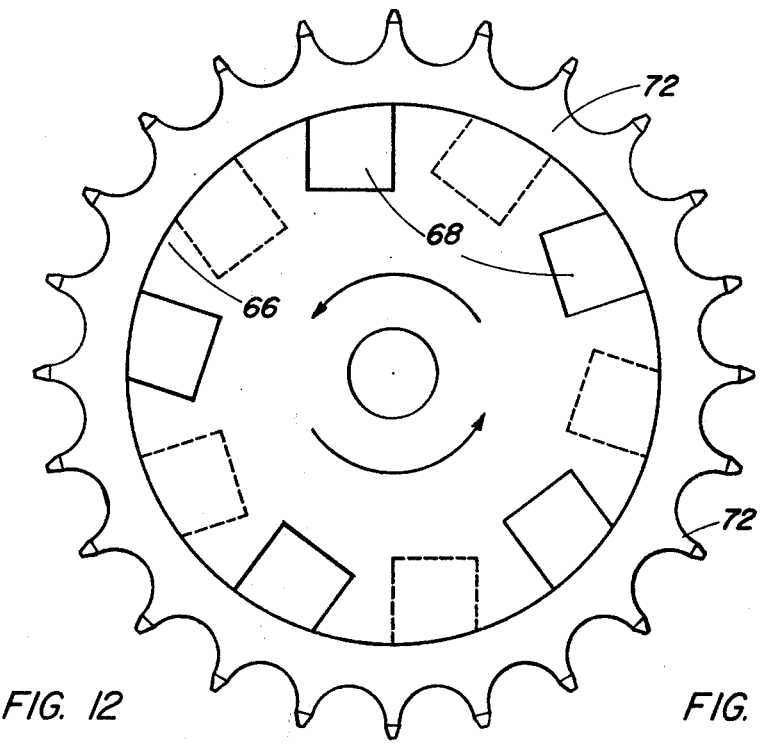
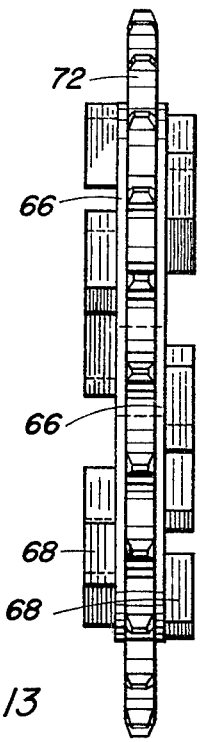
FIG. 12    FIG. 13
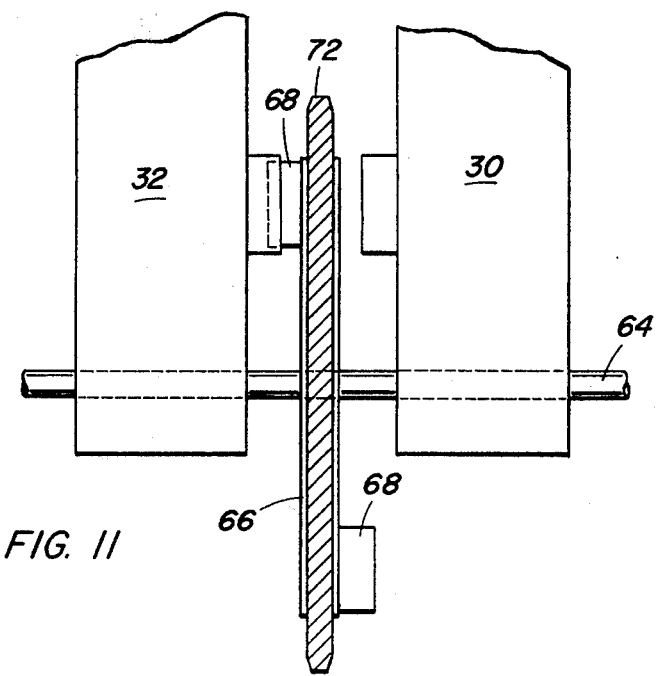
FIG. 11

PEDAL PLOW

BACKGROUND OF THE INVENTION

1. Field of the Invention

This invention pertains to snow plows generally and in particular to a snow plow which is pedal driven.

2. Description of the Prior Art

A search of the prior patent art fails to disclose any patents on pedal driven plows. The inventor does not know of any such device in published literature or commercially available. Manually propelled plows are known in the prior patent art such as those disclosed in U.S. Pat. Nos. 2,908,090, 4,048,735 and 3,664,042. U.S. Pat. No. 2,816,772 discloses a child's wagon with a plow, but the means of propulsion is not disclosed.

The principal object of the present invention is to provide a manually propelled plow which is pedal driven to provide more than simple manual force for the removal of snow. Another object is to provide a plow which does not consume gasoline or electrical energy for its use. Still another object is to provide a plow which also serves as an exercise vehicle, but is less strenuous than the manual shoveling of snow, requiring little more physical exertion than walking or cycling. Thus, the plow of this invention can be used by people of all ages, physiques and physical conditions.

SUMMARY OF THE INVENTION

The pedal plow of this invention comprises a rectangular frame supporting front and rear wheel axles and elevated support bars along each side. A plow blade is pivotally mounted on the front end of the frame. Two spaced apart pedal-like, longitudinally extending devices are positioned such that in a forward down position, their forward ends rest on a low support bar laterally positioned just behind the front axle. These pedal-like devices are pivotally connected to raised pivot blocks on the rear lateral frame bar. Two teethed gears are mounted on the rear axle substantially under the pedal like devices. The underside of the pedal-like devices have tongues which engage the teeth of the axle gears. As the pedal-like devices are pushed up and down by walking (the feet held in position by a strap), the tongues underneath the pedal-like devices alternately engage the gears on the rear axle shaft to provide forward propulsion. The tongues themselves are spring-mounted such that after they push a gear tooth downward, they return to an up-position to engage the next gear tooth. As the user walks with his feet on the pedal-like devices, the pedal plow is propelled forward. Straps are provided to retain the pedal-like devices in an upward position for manual use of the plow. Side handle bars are provided to facilitate use of the plow while standing up.

In an alternate embodiment, the tongues engage laterally oriented teeth placed on either side of a gear wheel which in turn engages a sprocket chain to provide propulsion for the rear axle.

The pedal plow of this invention requires no motor or fuel source, saving energy and money and avoiding environmental polution. Alternative embodiments can include a single geared pedal-device or adding tongues and gears on the front to provide four-wheel drive. The invention can also be made as a toy plow for children.

BRIEF DESCRIPTION OF THE DRAWINGS

FIGS. 4 through 9 illustrate various types of gears which may be used in the plow of this invention.

FIG. 11 is a top diagrammatic view of the drive gear for the embodiment of FIG. 10.

FIG. 12 is a side plan view of the drive gear for the embodiment of FIG. 10.

FIG. 13 is a top view of the drive gear means of FIG. 10.

DESCRIPTION OF THE PREFERRED EMBODIMENT

Figure 1:
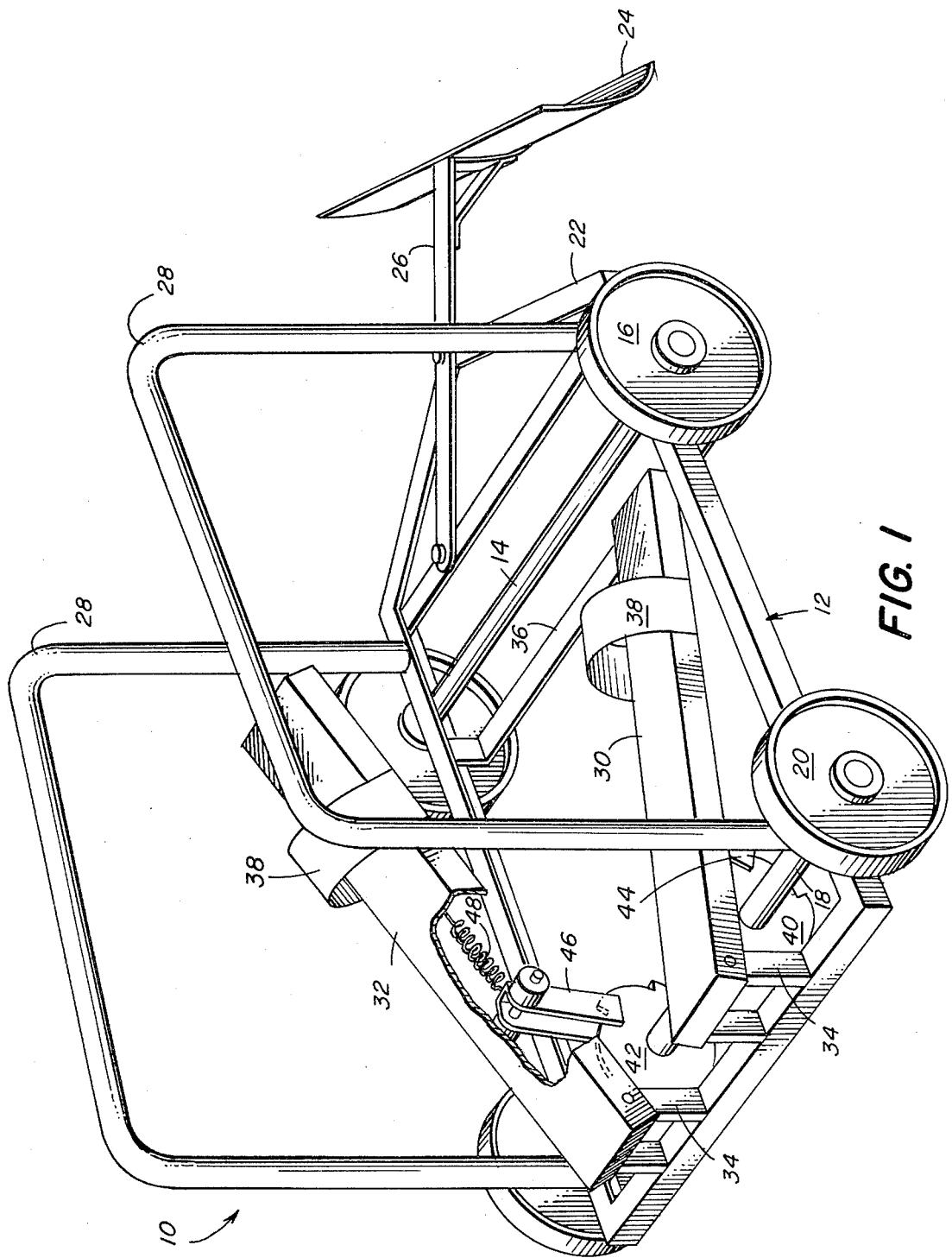
FIG. 1 is a partially cut-away side perspective view of the pedal plow of this invention.

Referring now to the drawings, the pedal plow of this invention is designated generally by the reference number 10. FIG. 1 illustrates the basic structure of pedal plow 10 which is built on a generally rectangular frame 12. A front axle 14 having two wheels 16 mounted thereon is positioned laterally near the front of frame 12 and a rear axle 18 is having two wheels 20 mounted thereon is positioned laterally near the rear of frame 12. A triangular plow support 22 is rigidly attached to frame 12. A plow blade 24 is adjustable secured by mounting brace 26 which is pivotally mounted at the apex of plow support 22 and angularly secured to plow support 22 and angularly secured to the front edge of frame 12. A pair of inverted U-shaped support bars 28 extend longitudinally along each side of frame 12 and are secured thereto.

Pedal plow 10 is propelled by a walking motion of the user on a pair of pedal-like devices designated generally by reference numbers 30, 32.

Devices 30, 32 shall be designated pedals hereinafter. Pedals 30, 32 are spaced apart, longitudinally extending, rectangular members positioned between the sides of frame 12. Pedals 30, 32 are pivotally mounted at the rear of frame 12 on raised pivot blocks 34 and extend longitudinally forward to a point just behind front axle 14. A depressed, laterally extending bar 36 secured to each side of frame 12, serves to limit the downward motion of the forward ends of pedals 30, 32. Each pedal 30, 32 also has a foot-retaining strap 38 near its forward end. A pair of spaced apart teethed gears 40, 42 are secured to rear axle 18, positioned such that gear 40 is under pedal 30 and gear 42 is under pedal 32. A pair of spring-loaded, pivotally mounted tongue members, 44, 46, are secured to the underside of pedals 30, 32 such that tongue 44 engages the teeth of gear 40 and tongue 46 engages the teeth of gear 42.

Referring now to FIG. 1, propulsion is achieved by the alternate depression and raising of pedals 30, 32. Pedal 32 is shown in a raised position with tongue 46 engaging a tooth of gear 42. When pedal 32 is depressed, tongue 46 will cause gear 42 to rotate clockwise, which, in turn causes rear axle 18 to turn clockwise, thus moving rear wheels 20 forward. At the same time, a walking movement of the user's feet will cause pedal 30 to be raised so that its tongue 44 (FIG. 2) can engage the next tooth on gear 40. The alternate depression and raising of pedals 30, 32 by a walking movement of the feet will result in continuous alternate engagement of gears 40, 42, thus causing continuous forward propulsion of pedal plow 10. Tongues 44, 46 are spring mounted by springs 48 so that after their arcuate movement downward, when they become disengaged from the teeth of gears 40, 42, they will spring upward for the next depression of their respective pedals 30, 32.

Figure 2:
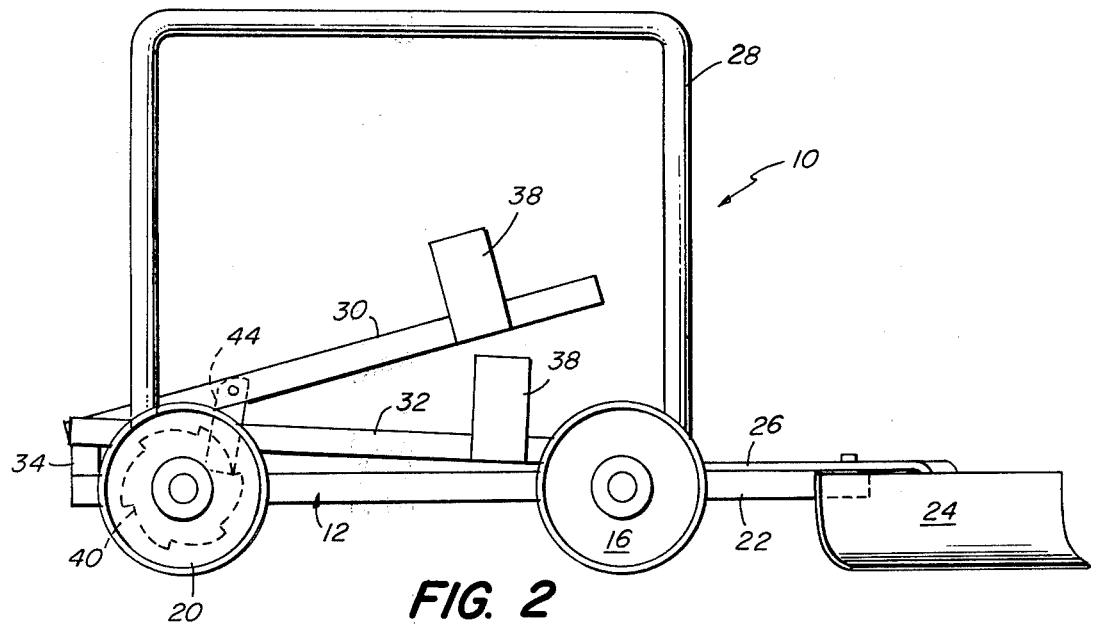
FIG. 2 is a side view of the plow of FIG. 1.

FIG. 2 is a side view of pedal plow 10 showing pedal 30 in the raised position with tongue 44 engaging a tooth of gear 40 just prior to its clockwise arcuate downward movement.

Figure 3:
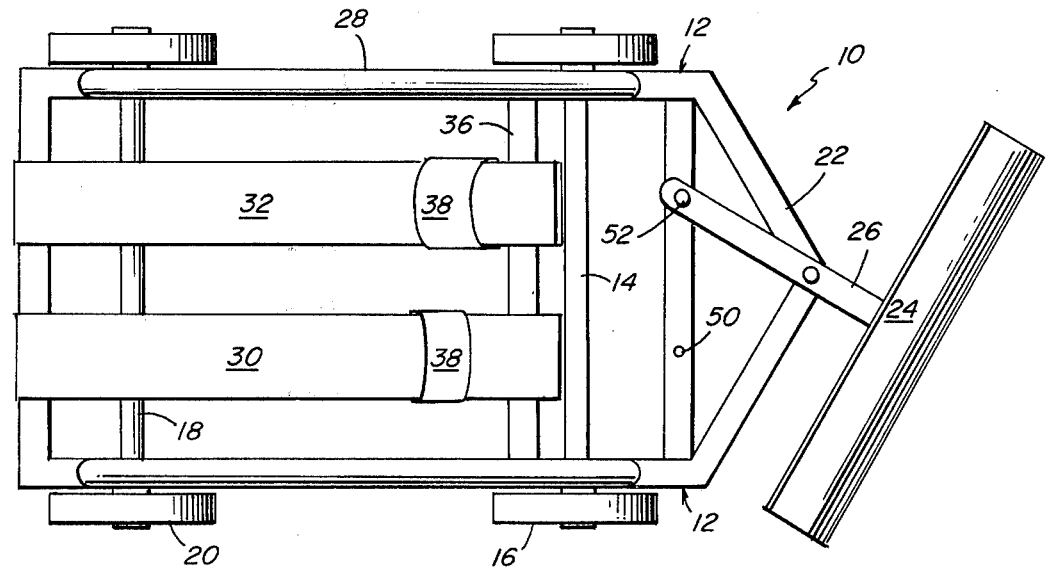
FIG. 3 is a top view of the plow of FIG. 1.

FIG. 3 is a top view of pedal plow 10 showing the relative positions of its components. FIG. 3 also illustrates the two angular positions at which bar 26 may have when it is secured to the front of frame 12 at points 50 or 52. Bar 26 could also be slidably mounted on the front edge of frame 12 is more varied plow blade angles were desired.

FIGS. 4 and 5 are front and side views respectively of a gear 60 which may be used in pedal plow 10. Gear 60 consists of two round steel plates 62 (one-eighth inch thick) having five or more screw-like pins 74 running through the plate 72. Pins 74 serve as gear teeth.

FIGS. 8 and 9 are front and side views respectively of a gear 80 which may be used in pedal plow 10. Gear 80 sandwiches in five or more gear teeth 82 between two round steel plates 84 (one-eighth inch thick). Each gear tooth 82 is held in position by two screws 86. The gear teeth may be of various sizes.

The gears illustrated in FIGS. 4 through 9 would be used under each pedal 30, 32 to engage tongue members 44, 46, as shown in FIGS. 1 and 2.

Figure 10:
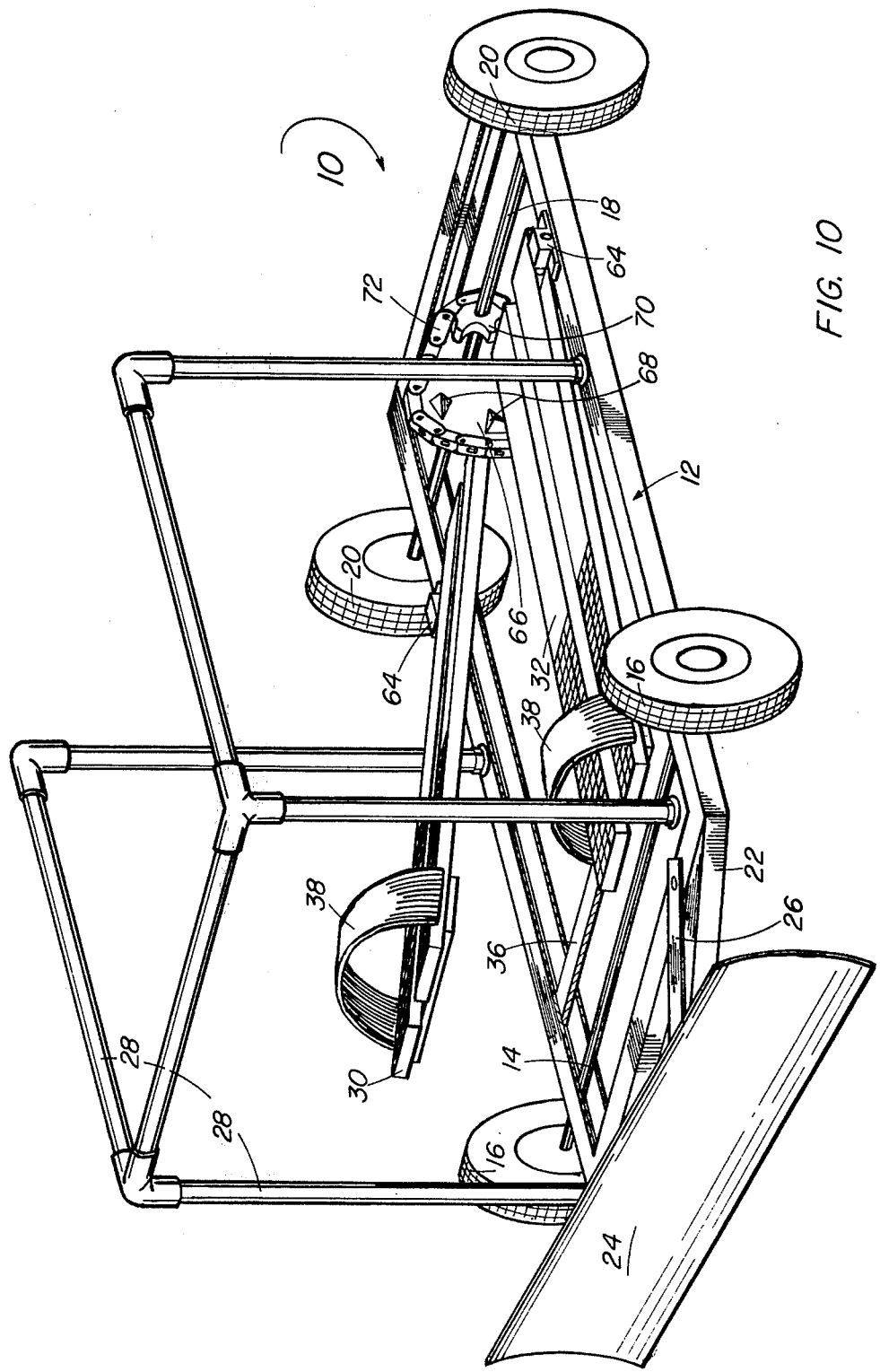
FIG. 10 is a perspective view of an alternate embodiment of the pedal plow of this invention using a chain drive means.

FIGS. 10 through 13 illustrate an alternate embodiment in which parts corresponding to similar parts in FIG. 1 have the same reference numbers. In the embodiment of FIG. 10, plow 10 has pedals 30, 32 pivotally mounted on axle 64 which extends laterally across frame 12 near the rear wheel axle 18. A sprocket gear 66 is centrally mounted on axle 64 between pedals 30, 32. Sprocket gear 66 has pyramidal shaped teeth 68 which protrude laterally from its side surfaces, which teeth have surfaces positioned to engage pedals 30, 32. A second sprocket gear 70 is centrally mounted on rear axle 18. A chain 72 connects sprocket gears 66, 70. The raising and lowering of pedals 30, 32 provides propulsion to pedal plow 10 through sprocket gears 66, 70 and chain 72.

FIG. 11 is a top diagrammatic view showing the relative locations of the propulsion means for the embodiment of FIG. 10.

FIG. 12 is a side plan view of sprocket gear 66 of FIG. 10.

FIG. 13 is a top view of sprocket gear 66 and a chain 72 of FIG. 10.

I claim:

1. A manually propelled pedal driven plow comprising:
    a rectangular frame;
    a front axle and a rear axle mounted laterally across said frame towards its front and rear edges;
    a pair of wheels mounted on each of said axles for rolling movement of said plow;
    a plow blade pivotally mounted to a bar secured to the front end of said frame;
    a pair of longitudinally extending spaced apart pedals pivotally mounted on said frame;
    a depressed lateral bar to limit the downward movement of the forward ends of said pedals;
    each of said pedals having a strap to secure the position of feet on said pedals;
    gear means mounted on a rear axle of said frame to engage said pedals;
    said pedals and gears means being engaged such that downward force exerted on said pedals result in driving said gear means, resulting in rotation of said axle and movement of the wheels mounted on said axle;
    alternate raising and depression of said pedals resulting in continuous rotation of said axle to propel said pedal plow.

2. The pedal plow of claim 1 wherein said gear means comprises:
    a pair of teethed gears mounted on said rear axle such that each gear is positioned beneath one of said pedals;
    said pedals extending rearward and over said gears;
    each of said pedals having spring-loaded tongues positioned beneath said pedals such that said tongues engage the teeth of said gears;
    the alternate depression and raising of said pedals resulting in arcuate movement of said gears causing continuous rotation of said axle.

3. The pedal plow of claim 1 further comprising:
    a second rear axle, spaced forward of said first rear axle;
    a first sprocket gear having sprocket teeth centrally positioned on said second rear axle between said pedals;
    said first sprocket gear having laterally extending teeth on each of its sides to engage said pedals;
    said gear means including:
    a second sprocket gear mounted on said first rear axle;
    a chain connecting said sprocket gears;
    the alternate depression and raising of said pedals resulting in continuous rotation of said sprocket gears thus resulting in propulsion of said pedal plow.

* * * * *